US008961071B2

(12) United States Patent
Critsinelis et al.

(10) Patent No.: US 8,961,071 B2
(45) Date of Patent: Feb. 24, 2015

(54) SYSTEMS AND METHODS FOR PROTECTING SUBSEA PIPELINE FROM EXCESSIVE STRESS OR FATIGUE LOADING

(71) Applicants: Antonio Carlos Falcao Critsinelis, Kingwood, TX (US); Hugh Miller Thompson, Houston, TX (US); Sid Ahmed Mebarkia, Sugar Land, TX (US); Edward Shintaro Nakajima, Sugar Land, TX (US); Estela Gonzalez, Houston, TX (US)

(72) Inventors: Antonio Carlos Falcao Critsinelis, Kingwood, TX (US); Hugh Miller Thompson, Houston, TX (US); Sid Ahmed Mebarkia, Sugar Land, TX (US); Edward Shintaro Nakajima, Sugar Land, TX (US); Estela Gonzalez, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 13/836,363

(22) Filed: Mar. 15, 2013

(65) Prior Publication Data

US 2014/0270967 A1    Sep. 18, 2014

(51) Int. Cl.
*B63B 22/00* (2006.01)
*F16L 57/00* (2006.01)
*F16L 57/02* (2006.01)
*F17D 5/00* (2006.01)

(52) U.S. Cl.
CPC ............. *F16L 57/00* (2013.01); *B63B 22/00* (2013.01); *F16L 57/02* (2013.01); *F17D 5/00* (2013.01)
USPC ............................. 405/171; 405/158; 405/173

(58) Field of Classification Search
CPC .............. F16L 1/20; F16L 1/24; B63B 22/18; B63B 22/20; B63B 22/22
USPC ............ 405/158, 171, 173, 184.5; 441/28, 29
See application file for complete search history.

(56) References Cited

U.S. PATENT DOCUMENTS

| | | | | |
|---|---|---|---|---|
| 3,257,672 A | * | 6/1966 | Meyer et al. | 441/29 |
| 3,613,616 A | * | 10/1971 | Basset | 114/328 |
| 4,121,529 A | * | 10/1978 | Smith et al. | 405/171 |
| 4,183,697 A | * | 1/1980 | Lamy | 405/170 |
| 4,191,494 A | * | 3/1980 | Nakamura et al. | 405/171 |
| 4,203,687 A | * | 5/1980 | Sumner | 405/170 |
| 4,563,108 A | * | 1/1986 | Ayers | 405/171 |
| 4,823,325 A | * | 4/1989 | Cole, Jr. | 367/20 |
| 5,007,364 A | * | 4/1991 | Buckle | 114/331 |
| 5,286,462 A | * | 2/1994 | Olson | 422/305 |
| 5,319,376 A | * | 6/1994 | Eninger | 342/357.4 |
| 5,379,267 A | * | 1/1995 | Sparks et al. | 367/18 |
| 5,466,420 A | | 11/1995 | Parker et al. | |
| 6,447,007 B1 | | 9/2002 | DiGiacomo | |
| 6,572,143 B2 | | 6/2003 | Yamato et al. | |
| 7,002,262 B2 | | 2/2006 | Miyata et al. | |
| 7,819,608 B2 | | 10/2010 | Joshi et al. | |
| 7,985,036 B2 | * | 7/2011 | Giovannini et al. | 405/171 |
| 2006/0062635 A1 | | 3/2006 | Mungall et al. | |
| 2006/0067792 A1 | | 3/2006 | Joshi et al. | |
| 2008/0056825 A1 | | 3/2008 | Joshi et al. | |
| 2008/0311805 A1 | * | 12/2008 | Spears et al. | 441/30 |
| 2009/0052992 A1 | * | 2/2009 | Thompson et al. | 405/158 |
| 2012/0312215 A1 | * | 12/2012 | Lyons | 114/54 |
| 2013/0028662 A1 | * | 1/2013 | Stenzel et al. | 405/171 |
| 2013/0029548 A1 | * | 1/2013 | Stenzel et al. | 441/133 |

* cited by examiner

*Primary Examiner* — Benjamin Fiorello
(74) *Attorney, Agent, or Firm* — Karen R. DiDomenicis

(57) ABSTRACT

Disclosed are systems and methods for protecting subsea pipeline from damage caused by excessive stress or fatigue loading caused by geo-hazards, and environmental and operating loads. The systems and methods utilize lifting buoyancy modules capable of being attached to a section of subsea pipeline to lift the subsea pipeline off the seabed to a predetermined height over a predetermined length upon being activated by a planned or unplanned triggering event.

16 Claims, 7 Drawing Sheets

SYSTEMS AND METHODS FOR PROTECTING SUBSEA PIPELINE FROM EXCESSIVE STRESS OR FATIGUE LOADING

FIELD

The present disclosure relates to systems and methods for protecting subsea pipeline and risers from damage caused by excessive stress or fatigue loading, and more particularly systems and methods utilizing buoyancy modules capable of being attached to a subsea pipeline or riser and lifting the subsea pipeline or riser off the seabed.

BACKGROUND

As subsea hydrocarbon production systems have evolved over time, certain challenges have become more problematic. One challenge is that subsea pipeline systems now traverse greater distances often at great depths. Another challenge is that certain subsea production fields necessitate installing subsea pipeline across difficult geographical formations along the seabed, including canyons, scarps and rough terrain, or in areas of high risk for geo-hazards such as mudflows, earthquakes, soil liquefaction and soil instability. Locating a pipeline in relation to such areas is of concern because it may be damaged by an impact generated by a geo-hazard, such as a mudslide or mudflow across the pipeline. A pipeline can also be damaged by fatigue due to vortex induced vibration or cyclic pipe movements due to slugging of the fluid flowing therein. Dynamic structures such as marine risers connected to platforms are susceptible to fatigue damage, as are pipeline scarp crossings with long unsupported spans. Very often these dynamic structures tend to have certain locations in which fatigue loading is more concentrated, such as sections near the touchdown point regions in steel catenary risers.

Conventionally, pipeline systems are designed to resist or withstand the forces associated with such geo-hazards. Detailed geo-hazards surveys and analyses are conducted to estimate the likelihood and severity of a geo-hazard event and associated loads on the pipeline. Current design processes, which involve multiple complex uncertainties, aim to assess the behavior of the pipeline when subject to extreme loading conditions and pursue a pipeline design that will sustain the impact forces and limit the risk of catastrophic failure. Current design mitigations include pipeline routing selection, engineered terrain excavation, horizontal directional drilling, stringent pipeline manufacturing standards, installation procedures and qualification testing, and the use of special materials, flexible elements, anchoring, and the like. These mitigations are very expensive and may have limited effectiveness to address the risks. Once there is damage to a producing pipeline leading to failure such as a rupture, current methods for containment of spills and repair solutions are limited. Pipelines, risers and scarp crossings are also often subject to operating and environmental loading, which can lead to cyclic stress in the pipe structure. This requires designing pipeline with high quality standards of fabrication to endure fatigue loads, such as tight tolerances, stringent welding standards and weld flaw acceptance criteria, limitations during installation and operation, qualification testing, etc.

It would be desirable to have an economical, reliable means for protecting subsea pipeline and riser systems from excessive loads associated with geo-hazards, environmental loading and operating loading and a response intervention method which could prevent significant production disruption. In addition it would be desirable to have a means to alleviate fatigue damage in critical regions of the pipeline and riser systems in a planned or contingency situation.

SUMMARY

In one aspect, a system is provided for protecting subsea pipeline or risers from excessive stress and/or fatigue loading associated with geo-hazards, environmental loading and operating loading. The system includes a plurality of lifting buoyancy modules capable of being attached to a subsea pipeline or riser wherein each of the plurality of lifting buoyancy modules has an activation mechanism associated there with and wherein the plurality of lifting buoyancy modules has sufficient buoyancy when at least a portion of the plurality of lifting buoyancy modules is activated to lift the subsea pipeline or riser off the seabed to a predetermined height over a predetermined length.

In another aspect, a method is provided for protecting subsea pipeline or risers from excessive stress and/or fatigue loading associated with geo-hazards, environmental loading and operating loading, in which the plurality of lifting buoyancy modules is attached to a subsea pipeline or riser.

DESCRIPTION OF THE DRAWINGS

These and other objects, features and advantages of the present invention will become better understood with reference to the following description, appended claims and accompanying drawings where:

DETAILED DESCRIPTION

The systems and methods disclosed herein are particularly useful for protecting subsea pipeline and risers from excessive stresses or fatigue loading associated with a variety of geo-hazards, environmental loading and operating loading. Throughout the present disclosure, it should be understood that systems and methods applicable to pipeline are also applicable to risers, pipelines crossing irregular features such as scarps, spans, or unstable areas subjected to potential geo-hazards. The geo-hazards can include sudden, one-time events or gradual long-term processes that can result in damage to the subsea pipeline over time. Examples of sudden events include mudflows or mudslides, earthquakes and earthquake induced soil liquefaction and sudden instability in free spans caused by sudden shifting in the seabed. Examples of gradual processes that can result in damage to the subsea pipeline include seabed settling over time and other known gradual geo-hazards. The systems and methods disclosed herein can be employed to respond or react to a triggering event. The triggering event can be a geo-hazard, a predictive event leading to a geo-hazard (such as increase in current magnitude) or a change in design conditions that requires some mitigation. The deployment of the mitigation can be sudden, almost immediately after the triggering event, or the deployment can be planned in such a way that the project team has a period of time to implement the mitigation after the triggering event or after a warning sign has been identified and communicated. Alternatively, the systems and methods disclosed herein can be employed on a proactive, planned basis to avoid stresses or fatigue loading associated with geo-hazards, environmental loading and operating loading. The systems and methods disclosed herein can be employed either temporarily or permanently.

Figure 1A:
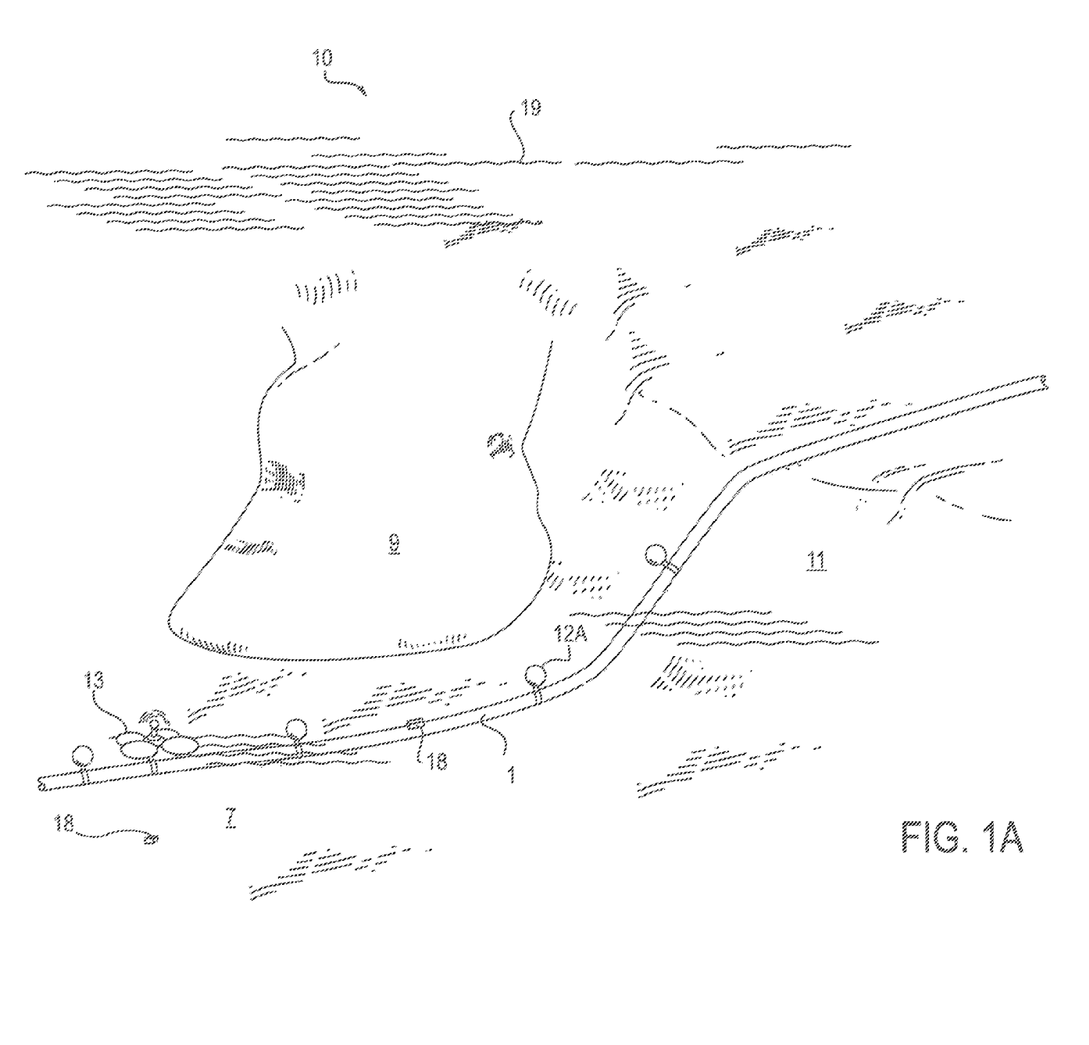
FIGS. 1A and 1B are views of a pipeline system fitted with lifting buoyancy modules according to one exemplary embodiment.
Figure 1B:
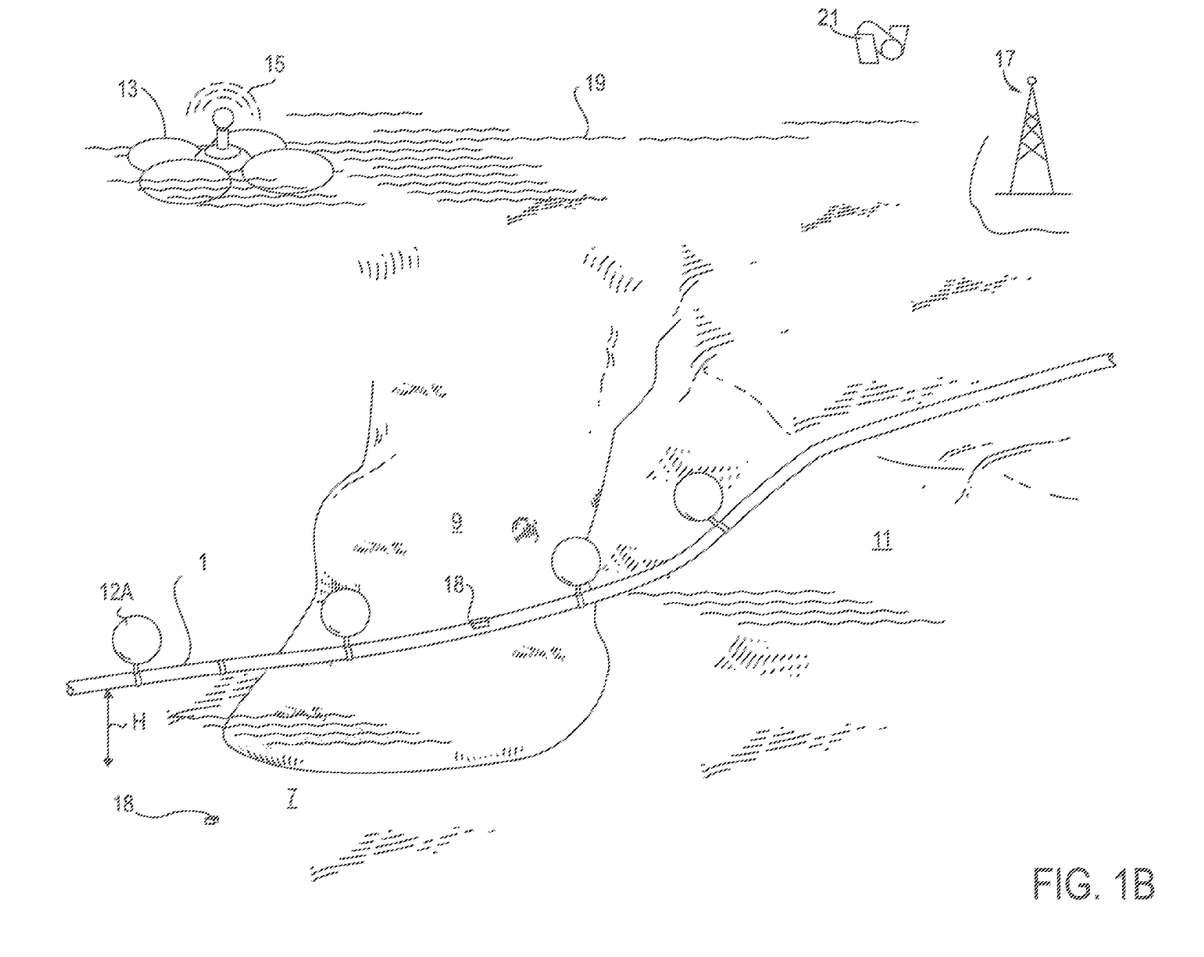

One embodiment of a system 10 implemented on a subsea pipeline located on a seabed 7 is illustrated in FIGS. 1A and 1B. FIGS. 1A and 1B further include a scarp 11 in the seabed 7 over which the pipeline 1 crosses. A plurality of buoyancy modules 12A having engineered lifting capabilities, also referred to herein as "lifting buoyancy modules," is provided which are capable of being attached to a subsea pipeline 1. By a plurality is meant two or more. The lifting buoyancy modules 12A are spaced at an engineered frequency. As illustrated in FIG. 1A, the lifting buoyancy modules 12A are normally in a non-activated state in which they either do not apply buoyancy force to the pipeline or apply insufficient buoyancy force to lift the pipeline off the seabed 7. This is also referred to herein as the "normal, non-activated state" of the lifting buoyancy modules. The lifting buoyancy modules can be activated by one of a number of activation mechanisms to be described herein. In some embodiments, the activation mechanisms are in communication with at least one sensor 18. As shown, the sensor 18 can be located on the pipeline 1 (or riser) or on the seabed 7. In one embodiment, the sensor can be located in the path of an anticipated geo-hazard.

When in the activated state, the lifting buoyancy modules have sufficient buoyancy force acting on the pipeline (or riser) to lift the subsea pipeline off the seabed. The activation of the lifting buoyancy modules causes the buoyancy force to exceed the pipeline submerged pipeline weight. The lifting buoyancy modules lift the pipeline off the seabed to a predetermined height H over a length of the pipeline. The predetermined height and length are advantageously sufficient to avoid the impact of a geo-hazard, to alleviate the fatigue damage or to reduce stress levels. Alternatively, the height can be variable as determined based on a sensor and processor system that detects leading geo-hazard events and calculates the required height to avoid geo-hazards, e.g., mudflows. The variable height lifting buoyancy module can be achieved by controlling the final volume of the buoyancy or by controlled activation of the sequence and number of deployed buoyancies.

Unlike existing pipeline systems in which the pipeline remains in place on the seabed and is subject to significant loads generated by a geo-hazard, e.g., a mudflow, the systems and methods disclosed herein allow the pipeline to escape such loads by lifting the pipeline above the mudflow height to protect the pipeline from displacing laterally so that the pipeline retains its integrity. Additionally, unlike existing dynamic pipeline, riser and scarp crossing structures in which the system is subject to continuous loading, the systems and methods disclosed herein alleviate the stresses, reduce the stress cycles and/or distribute the concentrated stresses imposed on the structures for improved structural protection, endurance and integrity.

In some embodiments, the system can be designed so that the pipeline is lifted in a controlled or progressive manner. This can be advantageous to avoid inadvertent damage to the pipeline caused by large buoyancy force suddenly applied to the pipeline. This can be accomplished by providing different levels of buoyancy force on the pipeline to lift the pipeline off the seabed at different rates. The system can be designed so that one or more lifting buoyancy modules of a given system are activated separately, simultaneously or in a timed sequence in accordance with sensor inputs or in accordance with a preprogrammed, planned sequence.

The activation mechanism for activating the lifting buoyancy modules can be activated or triggered by a signal sent to the activation mechanism from one or more sensors 18. In one embodiment, a sensor 18 is included in the system in communication with the activation mechanism of each of the plurality of lifting buoyancy modules for sensing the onset of a triggering event. The triggering event can be indicated by a predetermined ocean current magnitude ahead of sliding mudflows, turbidity caused by an approaching mudflow, pipe movement, pipe vibration, predetermined amount of time or a combination thereof. These can be detected by any of various types of sensors, including, but not limited to accelerometers, magnetometers, gyroscopes, current meters, sound detectors, vibration detectors and combinations thereof. Upon sensing the onset of a triggering event, the sensor sends a signal to an activation mechanism (to be described hereinafter) to activate the lifting buoyancy module. The sensor can be located in the system in any convenient location. For instance, the sensor can be attached to the subsea pipeline or to at least one of the lifting buoyancy modules. Alternatively, the sensor can be located remotely and separately from the subsea pipeline. For instance, the sensor can be located on the seabed near the pipeline.

Figure 2A:
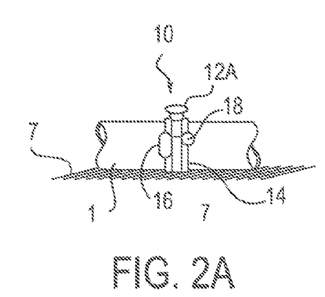
FIGS. 2A-2E are views of a pipeline system fitted with inflatable lifting buoyancy modules according to one exemplary embodiment.
Figure 2B:
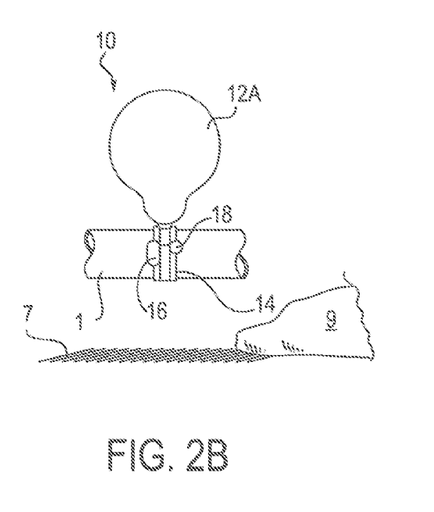
Figure 2C:
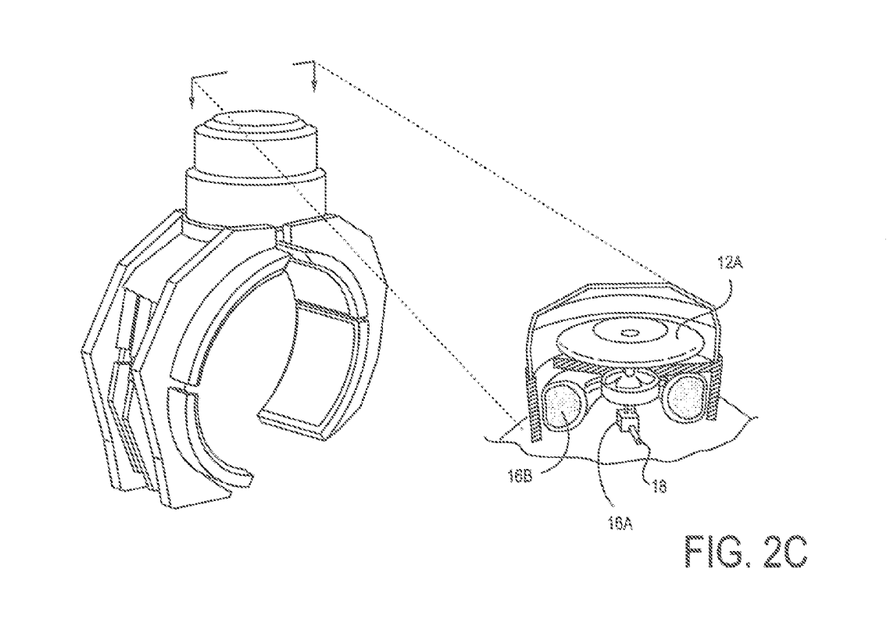

The activation mechanism for activating the lifting buoyancy modules can be any of a number of mechanisms contemplated by the inventors. In some embodiments 10, as shown in FIGS. 1A and 1B and FIGS. 2A through 2E, the lifting buoyancy modules 12A are inflatable. In such embodiments, each buoyancy module 12A includes as the activation mechanism an inflator 16 in communication with the sensor 18. The inflator 16 is capable of inflating or increasing the internal volume of the buoyancy module 12A, thus activating the buoyancy module 12A as shown in FIG. 2B. The inflator can utilize any of several suitable technologies. For instance, the lifting buoyancy modules can be collapsible and expandable buoyancy element which can be inflated from a source of gas. The collapsible and expandable buoyancy module 12A can be folded compactly to occupy a minimum volume when in its non-activated state as shown in FIG. 2A and FIG. 2C. Once activated, in response to a signal from the sensor 18, the buoyancy module 12A is inflated resulting in a maximum volume. The increase in volume in turn increases the buoyancy force or lift force applied to the pipeline section. The buoyancy module 12A can be deflated, refolded and repacked back to the non-activated state as required.

The inflation of the lifting buoyancy module 12A can be activated either manually (e.g., by divers, AUV or ROV), mechanically or chemically. In one embodiment, an ignition causes a chemical reaction of two or more components that can quickly generate gases. These gases inflate the bag and as a result generate buoyancy loads that lift the pipeline. Suitable gas generators or inflators 16 for use in the lifting buoyancy module have been described in references with respect to airbag inflators, e.g., for use in vehicles. For example, U.S. Pat. No. 6,572,143 describes a gas generator for an air bag including an outer shell vessel, an ignition unit disposed within the vessel, pressurized gas stored in the vessel, and a pressurized gas accommodation chamber for accommodating the pressurized gas. The outer shell vessel has openings in both ends thereof. One end is attached to a cylindrical diffuser nozzle having a gas discharge outlet communicating with the air bag in the outer peripheral wall thereof and a sleeve member inside. The ignition unit is disposed inside the sleeve member. The pressurized gas can be an inert gas, for example, argon, nitrogen, helium, or the like. The gas generator can have a gas discharge chamber within which is located a gas discharge unit. The gas discharge unit can be made of a pyrotechnic vessel for accommodating a pyrotechnic therein and a nichrome wire disposed in the pyrotechnic vessel and heated by electrification. The top of the pyrotechnic vessel can be positioned close to the brittle weak portion of a gas sealing plate within the gas generator so that the explosion force is concentrated on the brittle weak portion. The gas discharge unit operates upon receiving a signal so that it ruptures the brittle weak portion of the gas sealing plate to discharge the gas, thus activating the lifting buoyancy module 12A. In the gas generator 16, a sensor supplies a detection signal to a control unit which arithmetically calculates the detection signal to generate an output signal representative of the arithmetic operation result, and the output signal is supplied to the ignition unit. In this operation, a heating body within the igniter vessel is heated, thereby burning the ignition unit to generate a gas. The pressure of the generated gas moves the ignition body to rupture the gas tight-sealing wall. In this situation, the pressurized gas of the pressurized gas accommodation chamber is injected into the lifting buoyancy module 12A. The inflator or gas generator 16 can adjust the amount of supply gas by controlling the operation of the gas discharge unit. For example, when the subsea pressure is high, the lifting buoyancy module is inflated with an excessive internal pressure. In such a case, the gas discharge unit of the gas generator is operated in response to the operating signal from the control unit. When the nichrome wire is heated in accordance with the operating signal, then the pyrotechnic within the pyrotechnic vessel is ignited to produce an explosion force that ruptures the brittle weak portion of the gas sealing plate. As a result, the pressurized gas accommodation chamber communicates with the gas discharge chamber so that the gas within the pressurized gas accommodation chamber enters the gas discharge chamber through the ruptured opening and then discharges from the discharge port of the gas discharge chamber to the surrounding subsea environment. As a result, the lifting buoyancy module 12A is inflated with an appropriate internal pressure. Other references describing suitable gas generators or inflators 16 for use in the lifting buoyancy module 12A include, for example, U.S. Pat. Nos. 7,002,262, 5,466,420, and 6,447,007. The system can allow the replenishment of consumables such as gas, chemicals, etc. used in the process, which can be done by divers, AUV or ROV to enable multiple uses of the system.

FIG. 2C illustrates a clamp on device for attaching to a pipeline having an inflatable lifting buoyancy module 12A. A sensor 18 is in communication with a detonator or igniter 16A, which detonates in response to a signal from the sensor. Upon detonation or ignition, solid propellant material 16B is ignited quickly generating gas to inflate the buoyancy module 12A. The propellant material can be, for example, sodium azide.

In an alternative embodiment, a mechanical activation mechanism can use a system of ribs (not shown) which act as energized springs that when activated would be released, changing their physical configuration to result in an expanded buoyancy module reinforced by the ribs. In one embodiment, the inflation of the lifting buoyancy module 12A can be activated by a pressure accumulator (not shown) in fluid communication with the lifting buoyancy module 12A. A signal can be sent from the sensor 18 to open a valve in the pressure accumulator to inflate the buoyancy module 12A. A gas is stored under high pressure in the accumulator near the collapsed lifting buoyancy module in its non-activated state. Once the signal is sent from the sensor to open and inflate the buoyancy module, the gas will begin filling the buoyancy module at a pressure lower than the pressure in the accumulator.

Regardless of the mechanism for inflating the lifting buoyancy module, the system is designed to operate and perform under subsea and marine conditions, especially in terms of hydrostatic pressure and environmental loading caused by environmental factors including local currents. The system is designed with high strength materials to provide the required robustness to sustain the internal and external loads and to safely and reliably exert the lifting load to raise the pipeline to the desired height.

Figure 2D:
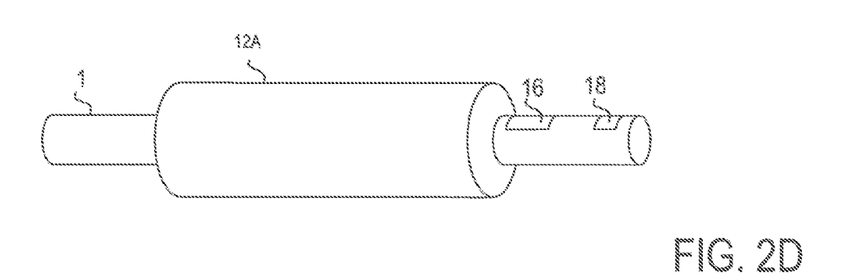
Figure 2E:
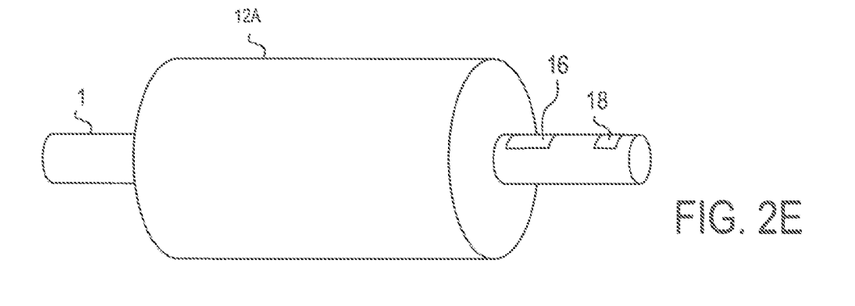

In one embodiment, as shown in FIGS. 2D (non-activated state) and 2E (activated state), the inflatable lifting buoyancy modules 12A can be radially disposed about the pipeline so that they surround the pipeline and inflate in the radial direction. In another embodiment, as shown in FIGS. 1A and 1B and FIGS. 2A and 2B, the inflatable buoyancy modules 12A can be in the form of balloons attachable to the pipeline either directly, by tethers or by any other suitable attachment means as will be apparent to one skilled in the art. The inflatable buoyancy modules can be normally (i.e., in their non-activated state) folded into compact capsules. The capsule can be installed on the pipeline with a clamp by an ROV during the pipelay operation or during a retrofitting operation.

In the case of inflatable buoyancy modules 12A, once activated and used to avoid damage from a geo-hazard, the inflatable buoyancy modules can be removed from the pipeline, e.g., by ROV, in order to return the pipeline to the seabed if desired.

Figure 3A:
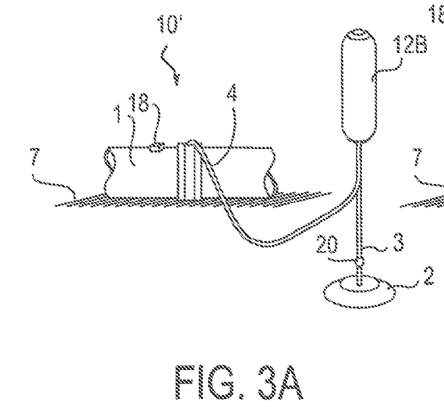
FIGS. 3A and 3B are views of a pipeline system fitted with lifting buoyancy modules according to another exemplary embodiment.
Figure 3B:
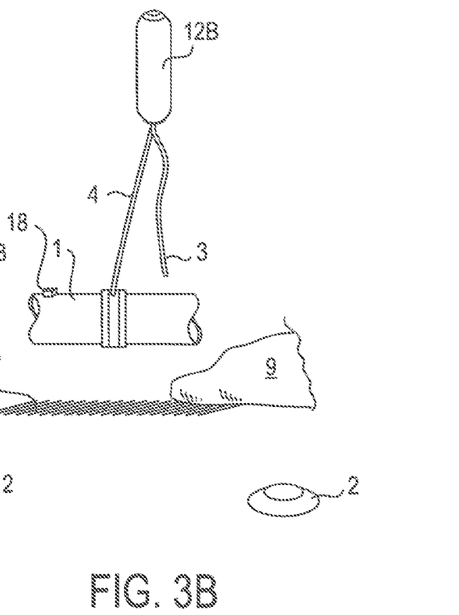
Figure 4A:
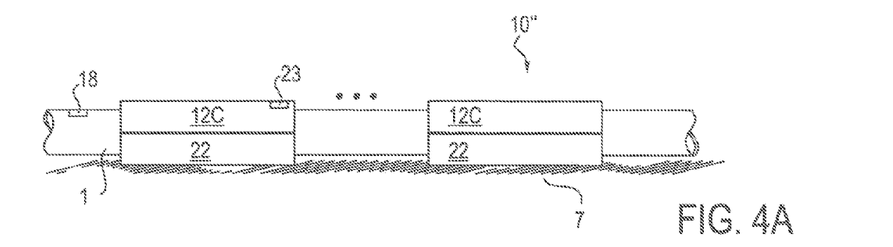
FIGS. 4A-4D are views of a pipeline system fitted with lifting buoyancy modules according to another exemplary embodiment.
Figure 4B:
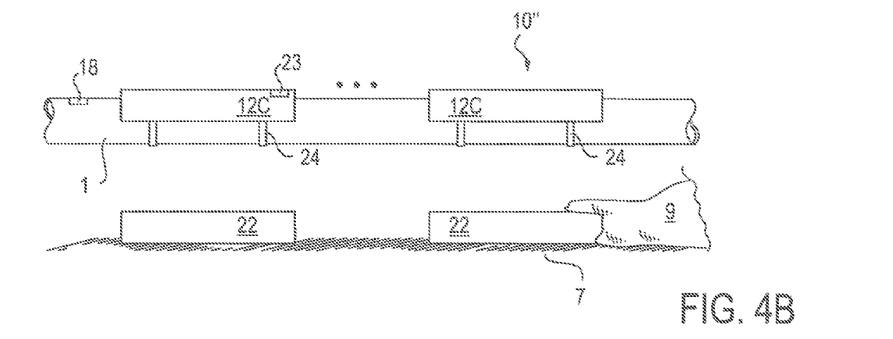
Figure 4C:
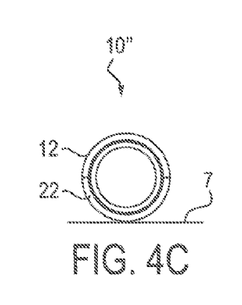
Figure 4D:
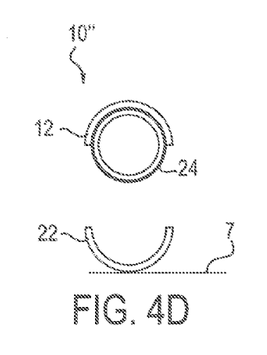

In some embodiments 10', for example that illustrated in FIGS. 3A and 3B, the lifting buoyancy modules 12B do not require inflating to become buoyant, and in their normal, non-activated state are attached to the pipeline by a plurality of lifting tethers 4. The lifting buoyancy modules 12B are further attached reversibly to anchors 2 in the seabed 7 by plurality of anchoring tethers 3. The anchors 2 can be anchor piles or clamp weights in the seabed. 7. While the anchoring tethers 3 are attached, in the non-activated state, the lifting buoyancy modules 12B are constrained from lifting the subsea pipeline 1. In such embodiments, the activation mechanism is detaching at least a portion of the anchoring tethers 3 such that the buoyancy force is transferred to the distributed lifting tethers 4 along the pipeline section of interest. In one embodiment, the activation mechanism can be a link 20 within the anchoring tether 3 that can be disconnected in response to a signal from the sensor 18. The activated lifting buoyancy modules 12B have sufficient buoyancy force acting on the pipeline to lift the subsea pipeline off the seabed to the design, predetermined height and length by way of the lifting tethers. In such embodiments, once activated and used to avoid damage from a geo-hazard, the lifting buoyancy modules can be reattached to the anchors, e.g., by ROV, in order to return the pipeline to the seabed if desired.

In some embodiments 10", for example, that illustrated in FIGS. 4A through 4D, the lifting buoyancy modules 12C do not require inflating to become buoyant, and in their normal, non-activated state are attached to the subsea pipeline 1 and reversibly attached to non-buoyant weights 22 such that when the lifting buoyancy modules 12C and the non-buoyant weights 22 are attached, the combination of the lifting buoyancy module 12C and the non-buoyant weight 22 provides no more than neutral buoyancy force applied to the pipeline. In one embodiment, the lifting buoyancy modules 12C attach to the non-buoyant weights 22 around the subsea pipeline 1 in pairs of half-shell clamps. The lifting buoyancy modules 12C and the non-buoyant weights 22 can also be reversibly attached by means of straps, bolts or the like. Alternatively, the non-buoyant weights 22 can be reversibly attached to the pipeline 1 and the lifting buoyancy modules 12C can be fixedly attached to the pipeline. The non-buoyant weights 22 can be made of steel covered with a layer of polymeric material. The lifting buoyancy modules 12C and the non-buoyant weights 22 are detached from one another in order to activate the lifting buoyancy modules 12C. When the lifting buoyancy modules 12C and non-buoyant weights 22 are detached from one another, the lifting buoyancy modules 12C remain attached to the subsea pipeline 1. In such embodiments, the activation mechanism is detaching at least a portion of the lifting buoyancy modules from the associated non-buoyant weights such that the subsea pipeline is lifted off the seabed. In one embodiment, the activation mechanism 23 is any convenient means for detaching the lifting buoyancy modules 12C from the non-buoyant weights 22 in response to a signal from the sensor 18. In one embodiment, not shown, the non-buoyant weights 22 are each articulated, i.e., formed of discrete segments joined together. Once detached, the articulated non-buoyant weights 22 will lie flat on the seabed 7. Once activated and used to avoid damage from a geo-hazard, the non-buoyant weights 22 can be reattached to the pipeline, e.g., by divers, AUV or ROV, in order to return the pipeline to the seabed 7 if desired.

Figure 5A:
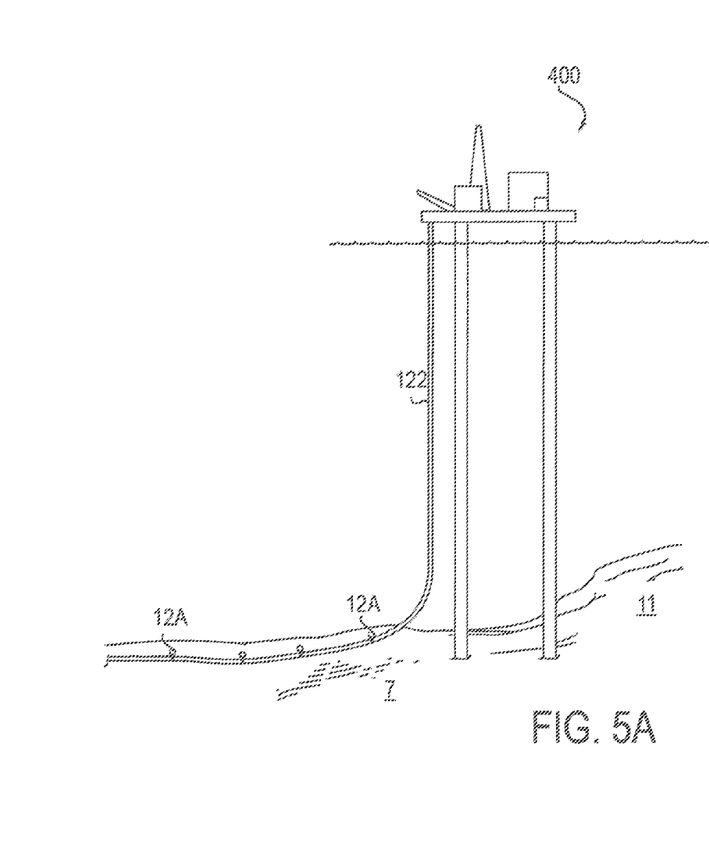
FIGS. 5A and 5B are views of a riser system fitted with lifting buoyancy modules according to another exemplary embodiment.
Figure 5B:
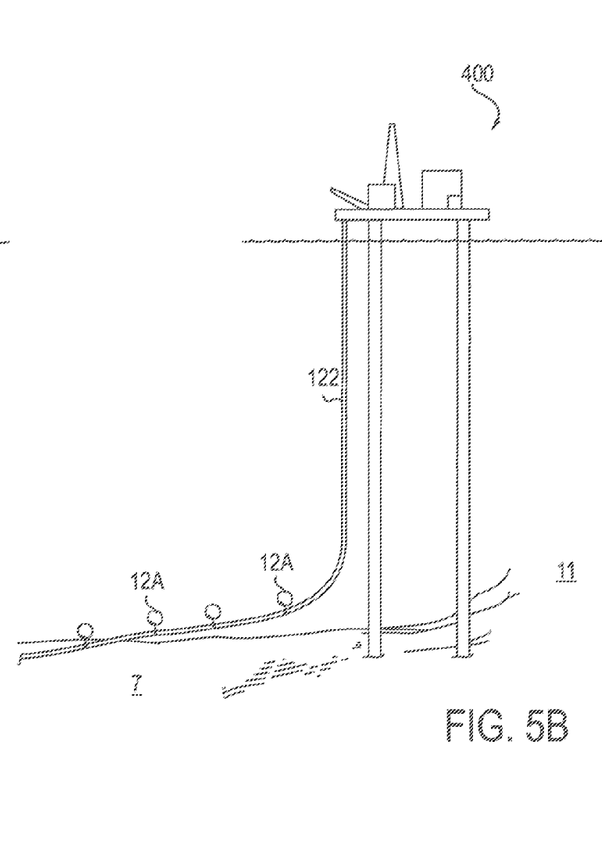

The systems described herein also provide a way to manage dynamic fatigue-sensitive regions of structures such as sections near the touchdown point of risers and pipeline over steep scarp crossings to alleviate damage or fatigue effects in anticipation of any change in original design basis, excessive environmental or operating loading, or geo-hazard that can lead to the accumulation or exacerbation of fatigue or that can lead to over-stress. In the system 400 illustrated in FIGS. 5A and 5B, this can be accomplished through selective activation of the lifting buoyancy modules 12A to relocate the touchdown point of a riser 122 and thereby redistribute stress and fatigue loads. A larger radius can be provided in the riser 122 by relocating the touchdown point. In one embodiment, the stresses within the riser are managed over time by periodically changing the number of buoyancy modules 12A attached to the riser and/or moving the regions along the riser in which lifting buoyancy modules are activated. Although FIGS. 5A and 5B illustrate a system utilizing inflatable lifting buoyancy modules 12A, any of the other lifting buoyancy modules described herein could also be utilized.

The lifting buoyancy modules can also be activated in the following cases: significant change in original design basis, operating conditions (planned or unplanned) such as excessive shut down and start up, changes in flow regime that can induce higher cyclical stress due to, for example, slugging, thermally induced loads or vibration, higher levels of corrosive fluids such as $H_2S$ than originally planned, and higher amount of motion in the system than originally planned. The lifting buoyancy modules can be selectively activated to change the pipeline configuration either temporarily or permanently.

In one embodiment, again referring to FIGS. 1A and 1B, the system further includes at least one buoy 13 having a global positioning system (GPS) transmitting device therein capable of being releasably attached to the subsea pipeline, as shown in FIG. 1A. Upon activation of any or all of the lifting buoyancy modules, regardless of the embodiment of the lifting buoyancy modules used, the buoy can be released from the subsea pipeline, as shown in FIG. 1B, and the GPS transmitting device can communicate with a satellite 21 and/or a receiving or monitoring device 17 at a remote location. This functionality is especially advantageous to alert operators of the occurrence of a triggering event. This functionality is also advantageous for tracking and recording planned activations of lifting buoyancy modules in a record-keeping database. In one embodiment, upon activation of at least a portion of the lifting buoyancy modules 12A, the GPS buoy will be released, float to the surface and transmit a signal 15 to inform personnel that the buoyancy modules 12A have been activated, and the location of the buoyancy modules activated. Furthermore, once the GPS buoy 13 is activated, text messages and emails can be sent to inform the operations team via cellular antenna. This buoy system allows for communication to a vessel or an onshore location via radio antennae. The GPS buoy 13 can be powered via battery (not shown) which will have rechargeable capabilities via an AUV. Alternatively, the upward movement of the buoy may be leveraged to recharge the battery. Although FIGS. 1A and 1B illustrate a system utilizing inflatable lifting buoyancy modules 12A, any of the other lifting buoyancy modules described herein could also be utilized.

In an alternative embodiment, the system can include at least one subsea acoustic transmitting device (not shown). Upon activation of any or all of the lifting buoyancy modules, the subsea acoustic transmitting device can communicate an acoustic signal to a receiving or monitoring device at a remote location. In one embodiment, warning data can be transmitted to a control station.

Figure 6:
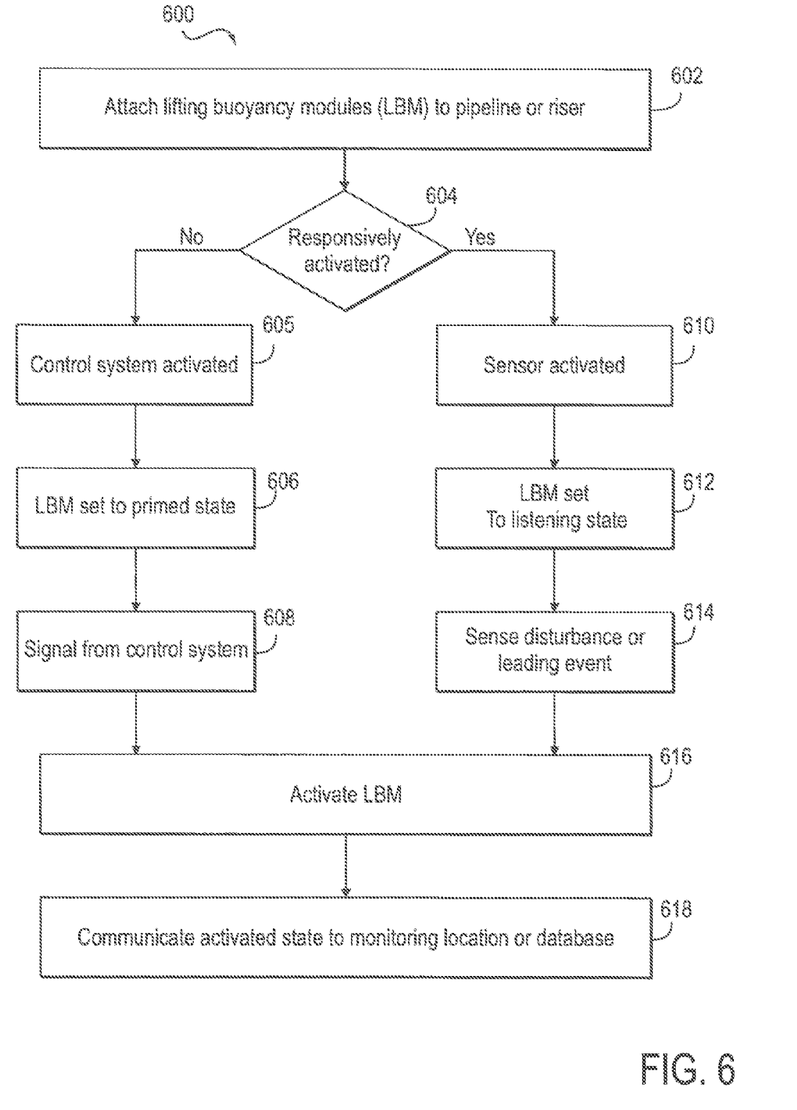
FIG. 6 is a flowchart describing methods according to other exemplary embodiments.

The flowchart 600 of FIG. 6 illustrates methods according to some embodiments. In a first step 602, lifting buoyancy modules according to embodiments disclosed herein are attached to a pipeline or riser. Decision point 604 in the design of the system asks whether the system is responsively activated (reactive) or not (planned or proactive). If yes, then the lifting buoyancy modules are sensor activated (610) and the lifting buoyancy modules are set to a listening state (612) to detect a sense disturbance or a leading event (614) detected by the sensor. Such disturbances or leading events have been described herein. Upon detection of the disturbance or leading event, the lifting buoyancy modules will be activated (616). Upon activation in step 616, the activated state of the lifting buoyancy modules will be communicated to a monitoring location or a database (618).

Still referring to the flowchart 600 of FIG. 6, when the system is not designed to be responsively activated, but rather proactively activated, then the lifting buoyancy modules are control system activated (605) and the lifting buoyancy modules are set to a primed state in which they can receive signals from the control system (606). Upon a signal being sent from the control system (608), the lifting buoyancy modules are activated (616), and the activated state of the lifting buoyancy modules will be communicated to a monitoring location or a database (618).

An existing subsea pipeline can be retrofitted with any of the systems disclosed herein. The method for retrofitting includes attaching a plurality of lifting buoyancy modules to a subsea pipeline, wherein the buoyancy module are activated according to any of the various embodiments of systems described herein. The lifting buoyancy modules and associated sensors can be installed with the assistance of an ROV, AUV or manually by divers.

EXAMPLE

A software package for the design and analysis of offshore marine systems, OrcaFlex (commercially available from Orcina Ltd., Cumbria, UK), was used to simulate the effects of the lifting buoyancy modules on a pipeline. The pipeline grade was assumed to be DNV-OS-F101 (DNV code assigned by Det Norske Veritas, Oslo, Norway).

The following table lists the inputs and the outputs when the simulation was run.

TABLE

| Inputs | |
| --- | --- |
| Stress (MPa) | 450 |
| Allowable stress (MPa) | 360 |
| Elastic modulus (MPa) | 212,000 |
| Pipe outer diameter (mm) | 762 |
| Wall thickness (mm) | 36.6 |
| Content density (kg/m$^3$) | 250 |
| Depth (m) | 740 |
| Results | |
| Uplift force per buoy (te) | 3.1 |
| Number of buoys | 30 |
| Average lift height (m) | 1.38 |
| Maximum lift height (m) | 2.13 |
| Length of pipeline at a height greater than 1.3 m (m) | 200 |
| Maximum stress (kPa) | 78,000 |
| % Maximum allowable stress | 22 |
| % Maximum strain | 0.037 |

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

From the above description, those skilled in the art will perceive improvements, changes and modifications, which are intended to be covered by the appended claims.

What is claimed is:

1. A system for protecting subsea pipeline from stress and/or fatigue loading, comprising:
    a plurality of lifting buoyancy modules capable of being attached to a subsea pipeline in a normally non-activated state and having an activation mechanism associated there with comprising an inflator located within each of the plurality of lifting buoyancy modules capable of increasing the volume of the lifting buoyancy module; and
    at least one sensor selected from the group consisting of an accelerometer, a magnetometer, a gyroscope, a current meter, a sound detector, a vibration detector and combinations thereof in communication with the activation mechanism of the plurality of lifting buoyancy modules for detecting an onset of a triggering event and upon detecting the onset of a triggering event, sending a signal to the activation mechanism to activate the associated lifting buoyancy module to lift the pipeline;
    wherein the plurality of lifting buoyancy modules has sufficient buoyancy when at least a portion of the plurality of lifting buoyancy modules is activated to lift the subsea pipeline off the seabed to a predetermined height over a predetermined length.

2. The system of claim 1, wherein the sensor is attached to the subsea pipeline or at least one of the plurality of lifting buoyancy modules.

3. The system of claim 1, further comprising:
    at least one signaling buoy having a global positioning system transmitting device therein capable of being releasably attached to the subsea pipeline;
    wherein upon activation of any or all of the lifting buoyancy modules, the signaling buoy is detached from the subsea pipeline and rises to the sea surface whereupon the global positioning system transmitting device in the signaling buoy communicates with a receiving device at a remote location.

4. The system of claim 1, further comprising:
    at least one subsea acoustic transmitting device;
    wherein upon activation of any or all of the lifting buoyancy modules, the subsea acoustic transmitting device communicates with a receiving device at a remote location.

5. The system of claim 1, wherein the inflator comprises a module in which a chemical reaction of two components occurs thereby releasing gas or a pressure accumulator.

6. The system of claim 1, wherein the inflatable buoyancy modules surround the subsea pipeline and are inflatable in the radial direction.

7. The system of claim 1, wherein each of the inflatable buoyancy modules comprises a balloon capable of being attached to the subsea pipeline via a flexible connector.

8. A method for protecting subsea pipeline from stress and/or fatigue loading, comprising:
    attaching a plurality of lifting buoyancy modules having an activation mechanism associated there with to a subsea pipeline wherein the activation mechanism comprises an inflator located within each of the plurality of lifting buoyancy modules capable of increasing the volume of the lifting buoyancy module wherein the plurality of lifting buoyancy modules has sufficient buoyancy when at least a portion of the plurality of lifting buoyancy modules is activated to lift the subsea pipeline off the seabed to a predetermined height over a predetermined length;
    providing at least one sensor selected from the group consisting of an accelerometer, a magnetometer, a gyroscope, a current meter, a sound detector, a vibration detector and combinations thereof in communication with the activation mechanism of the plurality of lifting buoyancy modules;
    using the at least one sensor to detect an onset of a triggering event; and
    upon detecting the onset of a triggering event, sending a signal from the at least one sensor to the activation mechanism of at least one of the plurality of lifting buoyancy modules to activate the lifting buoyancy module.

9. The method of claim 8, wherein the sensor is attached to the subsea pipeline or at least one of the plurality of lifting buoyancy modules.

10. The method of claim 8, further comprising releasably attaching to the subsea pipeline at least one signaling buoy having a global positioning system transmitting device therein, wherein upon activation of any or all of the lifting buoyancy modules, the signaling buoy is released from the subsea pipeline and the global positioning system transmitting device communicates with a receiving device at a remote location.

11. The method of claim 8, wherein at least one subsea acoustic transmitting device is attached to the subsea pipeline at a predetermined location, wherein upon activation of any or all of the lifting buoyancy modules, the subsea acoustic transmitting device communicates with a receiving device at a remote location.

12. The method of claim 8, wherein the inflator comprises a module in which a chemical reaction of two components occurs thereby releasing gas or a pressure accumulator.

13. The method of claim 8, wherein the inflatable buoyancy modules surround the subsea pipeline and are inflatable in the radial direction.

14. The method of claim 8, wherein each of the inflatable buoyancy modules comprises a balloon capable of being attached to the subsea pipeline via a flexible connector.

15. A system for protecting subsea pipeline from stress and/or fatigue loading, comprising:
  a plurality of lifting buoyancy modules capable of being attached to a subsea pipeline in a normally non-activated state and having an activation mechanism associated there with comprising an inflator located within each of the plurality of lifting buoyancy modules capable of increasing the volume of the lifting buoyancy module; and
  at least one sensor located on the seabed remote from the subsea pipeline in communication with the activation mechanism of the plurality of lifting buoyancy modules for detecting an onset of a triggering event and upon detecting the onset of a triggering event, sending a signal to the activation mechanism to activate the associated lifting buoyancy module to lift the pipeline;
  wherein the plurality of lifting buoyancy modules has sufficient buoyancy when at least a portion of the plurality of lifting buoyancy modules is activated to lift the subsea pipeline off the seabed to a predetermined height over a predetermined length.

16. A method for protecting subsea pipeline from stress and/or fatigue loading, comprising:
  attaching a plurality of lifting buoyancy modules having an activation mechanism associated there with to a subsea pipeline wherein the activation mechanism comprises an inflator located within each of the plurality of lifting buoyancy modules capable of increasing the volume of the lifting buoyancy module wherein the plurality of lifting buoyancy modules has sufficient buoyancy when at least a portion of the plurality of lifting buoyancy modules is activated to lift the subsea pipeline off the seabed to a predetermined height over a predetermined length;
  providing at least one sensor located on the seabed remote from the subsea pipeline in communication with the activation mechanism of the plurality of lifting buoyancy modules;
  using the at least one sensor to detect an onset of a triggering event; and
  upon detecting the onset of a triggering event, sending a signal from the at least one sensor to the activation mechanism of at least one of the plurality of lifting buoyancy modules to activate the lifting buoyancy module.

* * * * *